Jan. 15, 1935.  G. H. FRASER  1,987,615
AIR SEPARATOR AND DRIVEN DEVICE
Filed Jan. 19, 1924   3 Sheets-Sheet 1

INVENTOR:
George Holt Fraser

Jan. 15, 1935.  G. H. FRASER  1,987,615
AIR SEPARATOR AND DRIVEN DEVICE
Filed Jan. 19, 1924  3 Sheets-Sheet 2

INVENTOR:
George Holt Fraser

Jan. 15, 1935.                G. H. FRASER                1,987,615
                       AIR SEPARATOR AND DRIVEN DEVICE
                    Filed Jan. 19, 1924        3 Sheets-Sheet 3

INVENTOR:
George Holt Fraser

Patented Jan. 15, 1935

1,987,615

UNITED STATES PATENT OFFICE 1,987,615

AIR SEPARATOR AND DRIVEN DEVICE

George Holt Fraser, Brooklyn, N. Y.

Application January 19, 1924, Serial No. 687,359
Renewed July 10, 1930

25 Claims. (Cl. 209—139)

This invention relates to air separators and to driven devices, and aims to provide certain improvements therein.

It relates especially to vortex ring air separators having an outer casing enclosing a settling chamber within and in spaced relation to which an inner casing encloses a separating chamber having upper and lower openings communicating with the outer chamber affording an endless annular path for a separating current to circulate up through and down around the inner casing in the form of a vortex ring to separate and float fine material into the settling chamber and drop coarse material as tailings into a tailings conveying receiver, the material to be separated being distributed across a separating and distributing zone within and concentrically of the upleg of such vortex ring, and the current being circulated by a revolving fan above and concentrically of the separating chamber.

The invention aims to increase the efficiency and availability of such separators and devices and to improve their construction and operation.

One feature of my invention aims to improve such separators by providing an inner baffle wall in the separating chamber, spaced adjacent the outlet and a substantial distance above the distributor, for outwardly deflecting the upflowing current and affording below said wall and above said distributor a substantial selection chamber in which particles floating in such current may precipitate, which wall in the present adaptation of my invention is herein claimed as a cross outlet wall, extended a substantial distance across the upper outlet, and having an outer periphery adjacent and spaced from the upper outlet and above an intermediate portion of said chamber, and affords around such periphery a substantially direct upward passage from such intermediate portion of said chamber to the blower, as distinguished from the adaptation of such feature of my invention set forth and claimed in my Patent No. 1,834,095 dated Dec. 1, 1931 as a cross chamber wall extended outwardly a substantial distance across the chamber and having an outer periphery adjacent the outer wall of the chamber and above an outer portion of the separating chamber, and affording around such periphery and above such wall a circuitous current passage communicating from the outer portion of said chamber inwardly above said baffle and to the blower.

Another feature of my invention aims to improve such separators by providing within the separating chamber, and below and around the upper outlet, an annular inwardly extended baffle wall, for inwardly deflecting such upflowing current, adjacent the upper outlet and spaced a substantial distance above the distributor, for affording below said annular wall and above said distributor a substantial selection chamber in which particles floating in such current under said wall may precipitate, which annular wall has an inner periphery above an intermediate portion of the separating chamber for defining around the inner periphery of said annular wall a current outlet passage above an intermediate portion of said chamber to the blower, the inner periphery of said annular wall being preferably around and spaced from the outer periphery of said inner wall, for defining between said peripheries an annular upper current outlet passage above and from an intermediate portion of said chamber to the blower.

Another feature of my invention aims to improve such separators by providing in the upper part of the separating chamber and above the upper or selection zone thereof, rotary vanes or beaters, extended outwardly across the current outlet passage from such zone, so as to revolve in the path of the current outflowing from the separating chamber for ejecting from such outflowing current any larger particles or lighter particles or flakes floating in such current which had not been precipitated in such selection zone, which beaters are spaced a substantial distance above the distributor, and are circumferentially spaced for affording between them open upward current passages for out-passing such current from the separating chamber to the blower, and are relatively narrow compared to the width of the blades of the blower, and much narrower than the height of such selection zone, for minimizing their tendency to whirl or blow the outflowing current, and are preferably twistable to adjust their inclination to such inclination intermediate a vertical and horizontal position as may be best suited for impactively out-beating such particles with the minimum of retarding effect on the out-flowing current, as distinguished from the whirling fan blades adjacent the distributor and a substantial distance below the upper outlet shown and claimed in my patent, No. 1,542,050, dated June 16, 1925.

Another feature of my invention aims to improve such separators by providing an inner annular valve within the separating chamber and below the distributor and above and spaced inwardly of the lower inlet, and adjustable below the distributor and above the lower inlet, for radially varying the annular space between such valve and the inner wall of the separating chamber through which the returning current may upflow from the lower inlet to the distribution zone, which valve is preferably a vertically adjustable inverted conical ring within and opposite and similarly inclined to the inclined lower wall of the separating chamber, for varying the upflowing current below the distributor and above the lower inlet, as distinguished from my valve above the distributor for varying the current outflowing from the separating chamber shown and claimed in my Patent No. 1,834,095 dated Dec. 1, 1931, and from my external valve around the separating chamber shown and claimed in my co-pending application Ser. No. 737,411 filed Sept. 12, 1924, which valves vary the current remote from the zone of distribution instead of below and adjacent such zone.

Another feature of my invention aims to improve such separators by providing them with a movable tailings receiver responsive to variations in the weight of the stream of material flowing on to such receiver, and in operative relation to the separating elements, for controlling or varying the operation of the separator with variations in such weight, which receiver in the adaptation of such part of my invention herein claimed is preferably operatively connected to variable supply means, for varying the supply of material to be separated with variations in such weight, and is preferably connected with speed accelerator means, for accelerating speed of revolution of the blower or for increasing the force of the separating current with increase in such weight, and is preferably operatively connected with speed accelerator means, for accelerating speed of revolution of the distributor, for increasing distribution of material with increase in such weight, as distinguished from the adaptation of such part of my invention shown and claimed in my co-pending application Serial No. 737,411 filed Sept. 12, 1924, in which such receiver is shown and claimed as operatively connected with drive discontinuance means, for discontinuing drive of the separator with abnormal increase in such weight, and as operatively connected with speed reducer means, for reducing speed of revolution of the blower with increase in such weight, for reducing the force of the separating current with such increase, and as operatively connected with speed reducer means, for reducing speed of revolution of the distributor with increase in such weight, for reducing distribution of material with such increase.

According to another feature of improvement in such separators I preferably provide within and around the separating chamber and above its distributor, spaced superposed baffle faces, in staggered relation, with hollow lower faces extended across and opposed to the direction of outflow of the separating current, for causing such current to circulate between them in a sinuous path, for intercepting particles floating in such current, which baffles are preferably circumferentially spaced, below and around the upper outlet, and extended radially across the annular path of such current flowing from the separating chamber to the upper outlet, as distinguished from the vertically extended outside baffles shown in my Patent No. 1,542,050 dated June 16, 1925, and Gay's Patent No. 1,517,900, dated Dec. 4, 1924.

According to another feature my invention aims to improve such separators by providing them with an inlet conduit in communication from a source of additional or other external fluid without the outer casing of the separator to within such casing, for introducing additional external fluid within the circulating separating fluid, for drying or treating with such additional fluid the separating fluid or the material being separated, which conduit according to that adaptation of my invention herein shown and claimed preferably discharges such additional fluid within the separating chamber, and concentrically inwardly of the upflowing leg of the separating fluid, above the distributor, as distinguished from the adaptation of this feature of my invention shown and claimed in my companion application Ser. No. 737,411 filed Sept. 12, 1924, in which such introduction is shown and claimed as effected below the distributor.

According to another feature my invention aims to improve such separators by providing them with an external discharge exhaust conduit, in communication from within the separating fluid to, and having an external discharge without, the outer casing of the separator, for exhausting, and discharging externally of the separating fluid, pressure, for maintaining the desired condition of the separating fluid during its circulation, or for withdrawing vapor, incident to vaporization of the moisture content of the material being separated, which external discharging exhaust conduit, according to the adaptation of such part of my invention herein shown and claimed, preferably is extended into the separating chamber, and has an exhaust opening affording a vertically adjustable vapor withdrawal chamber, within and concentric of the upflowing leg of the separating fluid, and below the distributor and above the lower current inlet, as distinguished from that adaptation of this feature of my invention shown and claimed in my companion application Ser. No. 737,411 filed Sept. 12, 1924, in which such external discharge exhaust conduit is shown and claimed as having an exhaust opening below or without the separating chamber and below and concentric of the path of circulation of the separating fluid.

Another feature of my invention aims to improve such separators by providing intermittent low frequency power operated jarrers above the blower, for power jarring the sub-blower internal parts of the separator from above the outer casing, and past the fan blades, and in the adaptation of my invention herein claimed I preferably provide speed reducer means driven from the distributor drive shaft, vertically impactive dropper hammers, actuated intermittently at low frequency by such reducer means, and preferably swing on a horizontal axis, and vertical anvil jarrers struck by said hammers and disposed without and around, and extended vertically past, above, and below, the outer edges of the fan blades, and in operative relation to such internal parts for vibratorily acting toward them vertically, as distinguished from the adaptation of such feature of my invention set forth in my said application Ser. No. 737,411 filed Sept. 12, 1924, in which such jarring mechanism is shown and claimed as driven from the blower drive wheel, and as radially impactive hammers swinging radially of the outer ends of the fan blades, and acting impactively radially toward the internal parts below such blades.

To this end in carrying out the preferred adaptation of my present improvements I preferably utilize traction or friction for driving a separator, and I provide various other features stream of material flowing through the separator, all of which will be more fully hereinafter set forth.

Preferably the fan F is mounted on a vertically movable sustaining tubular shaft L which revolves in a bearing M and has fixed to its upper part a driven sustaining friction or other variable or slow speed fan revolving wheel N, which rides on and is frictionally driven by a driving sustaining friction roller O which is axially adjustable to vary the speed of the fan, or out of engagement with the wheel N to disconnect the fan drive, and is carried by a sliding shaft P driven by a pulley Q and operated by a shifter R to vary its position and adjust it in to increase fan speed or out to diminish such speed or out of engagement with the wheel to stop fan drive.

Preferably the distributor is mounted, as by a set screw w', on a vertically movable or adjustable sustaining depending tubular shaft T within and concentric of the fan shaft L and surrounding the feed pipe C, which shaft T is mounted on a driven sustaining friction or other variable or slow speed distributor revolving wheel U, tractionally driven and supported by a driving sustaining friction roller V mounted on a tubular shaft W surrounding and revolving with the shaft P and adjusted axially relatively thereto by a shifter X, to vary the speed or disconnect drive of the distributor in the manner above described.

The shafts P and W are preferably mounted in a tubular shaft Y carrying the high or constant speed driving means or pulley Q and fixed axially in relation to its outer bearing Z, and all these shafts are connected to revolve with this pulley by a pin a traversing each and passing through slots b in the inner shafts which are long enough so that each can be adjusted as required for their independent axial movement while all must revolve together.

The outer bearing Z may be rigid to sustain the load on the roller or rollers, but as my invention provides for sustaining this load in the manner which will hereinafter be described I prefer to make the bearing Z rock on a horizontal axis and provide a vertically sliding bearing c at the inner side of the pulley Q, so that the drive shaft or shafts can move vertically relatively to these bearings which however position them against other stress.

The weight of the driven parts, preferably, acting through the wheels N and U on the rollers O and V affords sufficient traction for driving purposes, and these wheels and rollers afford speed reducing and varying driving means by which preferably the driven parts will both be driven in the same direction but at different low and independently variable speeds according to the proportions of the wheels and rollers, which will be relatively proportioned to suit individual requirements. In the case illustrated the mean speed of the fan should be about double that of the distributor when the rollers are in their mid positions, from which individual adjustment may occur as desired for relative variation, or complete disengagement be made for discontinuing drive of either or both driven parts. In the latter case the shaft L moves down until the hub of the wheel N rests on and is supported by the top edge of the bearing M, and the shaft T moves down until the hub of the wheel U rests on and is supported by the wheel N.

My invention preferably provides for balancing the load utilized for traction to avoid other stress, and attains this by providing one or more similar rollers O' V' co-acting with the friction wheels at points diametrically opposite to or equidistant from the driving rollers, which may be positively mounted against vertical or axial movement and be mere sustaining idlers, but are preferably mounted in bearings similar to the bearings Z and c of the drive shaft and on independently rotative but not axially movable shafts P' and W' respectively. As these rollers travel according to the speed of their respective wheels axial adjustment of them is not necessary.

As thus far described traction would be limited to the contact between the driving rollers and their wheels respectively, and these rollers would have to be sustained to give the desired contact by bearing c which would have to be vertically positioned and sustained accordingly as by the screw d adjustable into and out of engagement with it for such purposes, but my improvements in drives aim to increase the traction and balance the load in such devices and to relieve the bearings of the stress incident to the desired traction.

To this end I preferably provide reciprocal reversely revolving parts co-acting with the intermediate part to resist and balance the radial stress of the latter on its diametrically opposite sides, and I preferably multiply the intermediate part to balance the stress on the reciprocal parts and to tractionally co-act with these so that each intermediate part carries part of the load and traction and one of the reciprocal parts sustains the intermediate parts against the other reciprocal part and transmits stress from one to another of the intermediate parts to convert each into a supplementary driving part.

In the construction shown this is preferably accomplished by providing a friction or other supplementary variable or low speed fan revolving wheel N' opposite the fan revolving wheel N and co-acting with its rollers O and O' to sustain the weight of the fan and transmit the peripheral motion of the lower side of the roller O to rollers O' so that these will be tractionally revolved and tractionally revolve the wheel N, thus supporting and driving the latter at two or more points and relieving the shaft P and its bearings of the load utilized for traction.

The reverse wheel N' is preferably anti-frictionally and rockingly mounted on a compensating ball bearing M' the upper face of which is shaped like a segment of a sphere to receive the similarly shaped socket of the wheel, so that the wheel can oscillate if necessary to compensate for any irregularity such as a slight difference in diameter of any of the intermediate rollers, or the entrance of any foreign matter between the parts. These parts are constructed to normally hold the hub of the wheel N out of contact with the upper end of its bearing M so that they will carry the entire weight of the fan shaft L and of the fan F and the outwardly extending wall e' mounted on and revolving with the shaft L.

A similar reverse or other supplementary variable or low speed distributor revolving wheel U' is preferably provided opposite the distributor revolving wheel U and co-acting with the rollers V and V', and functions with them similar to the manner just described. This wheel preferably carries the ball bearing M' and is mounted on a similar compensating ball bearing T' which sustains it and the other wheels and rollers, and is mounted on the shell e enclosing these parts, and affording a bearing f above them for the upper end of the drive pipe T, above which it of improvement in the construction arrangement and use of air separators which will hereinafter be more fully set forth.

My present improvements are applicable to a wide range of mechanical devices, and can be applied to many transmission uses, but for purposes of illustration I will describe them in their preferred form as applied to and used or availed of with the preferred form of my improved air separator with reference to the accompanying drawings in which.

Figure 1:
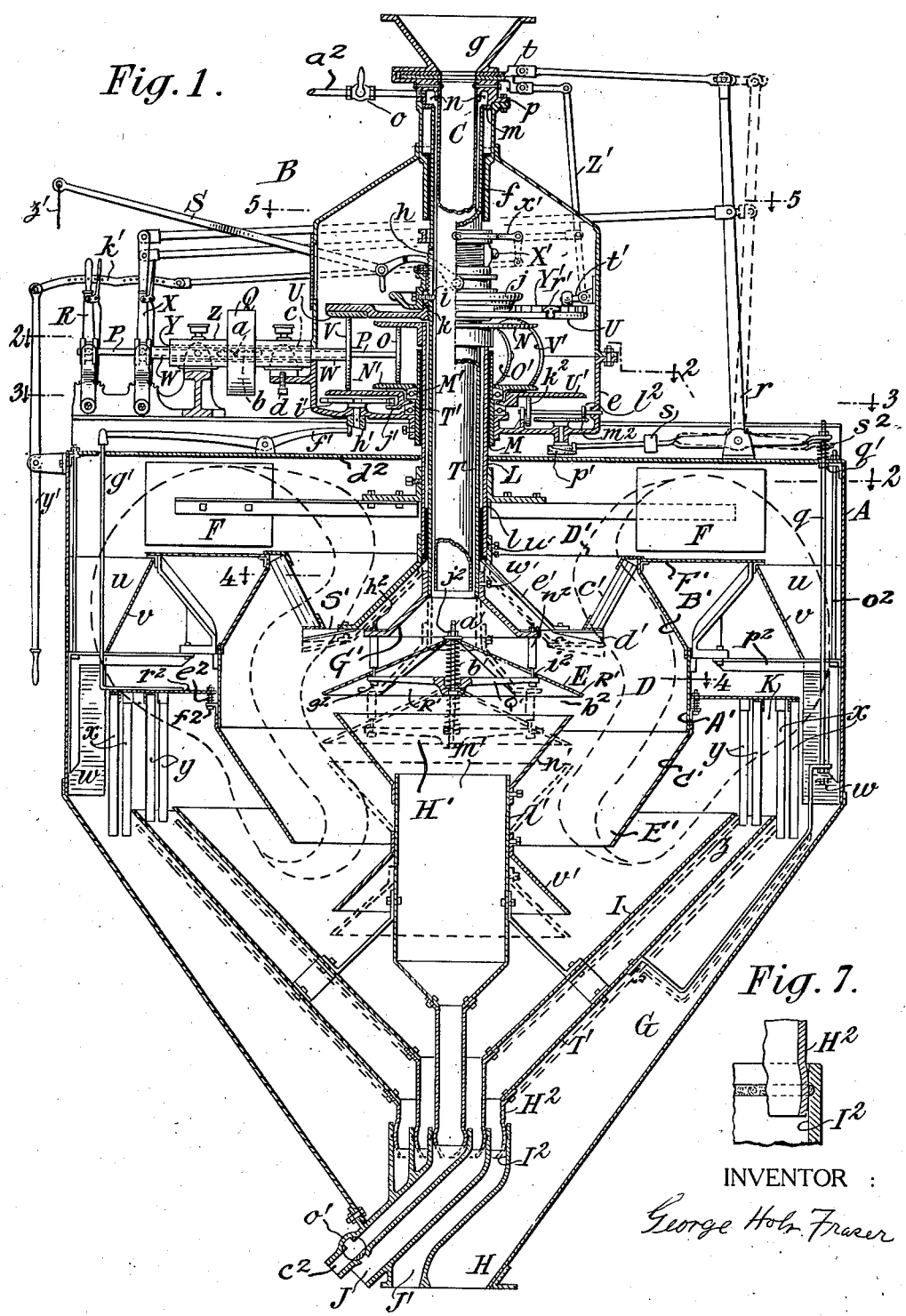
Fig. 1 is a vertical axial section of an air separator embodying the preferred form of my improvements the internal parts being shown in full lines as adjusted vertically to their upward positions.
Figure 7:
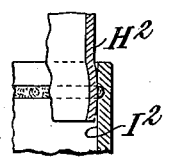
Figs. 4, 5, 6 and 7 are fragmentary views illustrating details.
Figure 2:
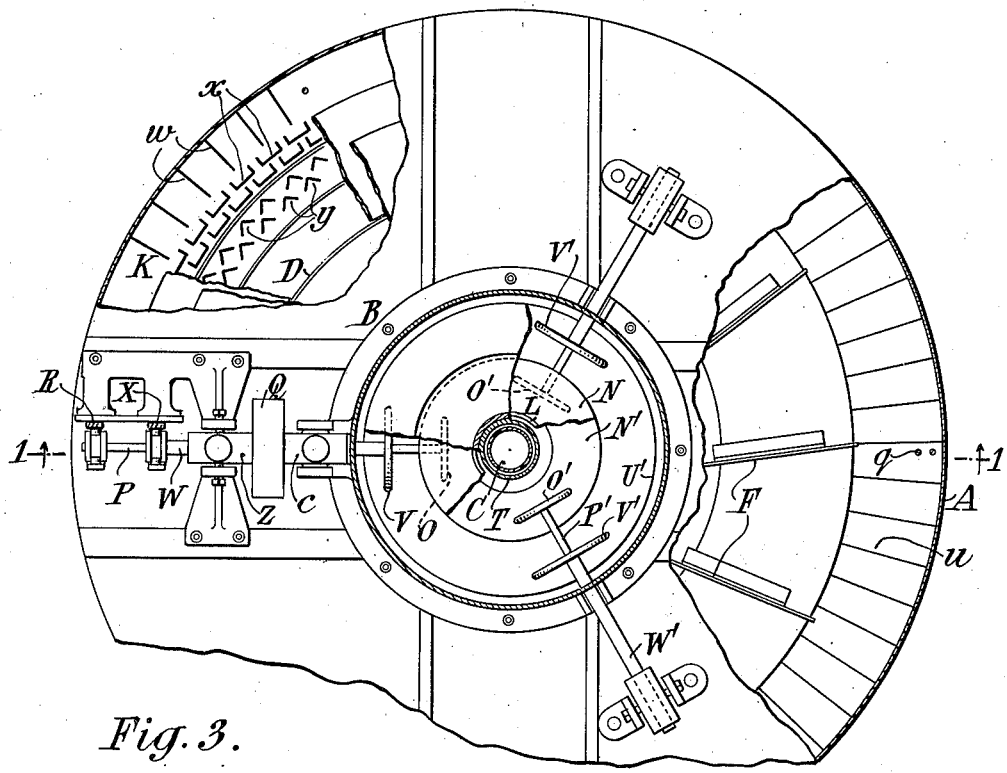
Fig. 2 is a horizontal section thereof cut on the lines 2—2 in Fig. 1.
Figure 3:
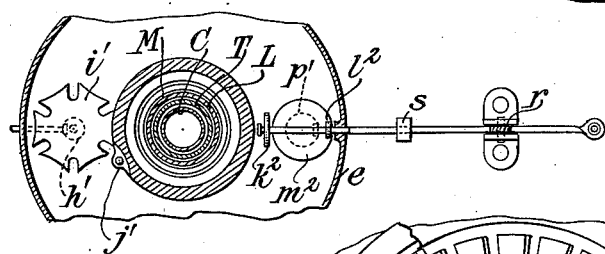
Fig. 3 is a fragmentary horizontal section thereof cut on the planes of the lines 3—3 in Fig. 1.

Referring especially to Figs. 1, 2 and 3 I will now describe the preferred form of my invention as applied to and used or availed of with an air separator.

Referring to the drawings let A represent the main frame or casing of an air separator, B the drive mechanism thereof, C the feed supplying means or inlet pipe therefor, D the inner or upper receptacle or separating chamber thereof, E the feeder or distributor therein, F the fan or blower therefor, G the dust or precipitation or fine settling chamber, H the dust or fine outlet, I the lower receptacle or tailings conveyor or receiver thereof, and J the coarse or tailings outlet or contracted orifice for conveying and discharging a normal stream of tailings from the receiver I.

These parts may be of any usual or suitable construction for utilizing a fluid current to separate a fine or light from coarse or heavy material by causing a current to rise through the material as it is distributed in the feed chamber so as to float the lighter particles into the fine chamber and permit the heavier particles to fall as tailings from the separating chamber on to the tailings receiver and escape through the coarse outlet.

The casing A usually has a flat top, $d2$, separably and removably connected to cylindrical sides and a conical bottom, enclosing the chamber G.

The receptacle D is usually an annular wall having a cylindrical center or vertical wall A' opposite the distributor, a downwardly and outwardly extending inclined or conical annular upper wall B' within and above the wall A', and a downwardly and inwardly extending inclined or conical annular lower wall C' below the wall A', affording reversely tapering contracted upper and lower portions affording upper and lower openings D' and E' communicating with the chamber G within which it is mounted in spaced relation to the outer walls of the casing A. It has a flat annular top wall or shelf F' above which the blades of the fan F revolve to cause current to rise through the separating chamber, descend through the dust chamber and return through the lower opening and again rise through the separating chamber in the form of a vortex ring as indicated by the endless dotted line in Fig. 1.

Filtering or other current cleaning means K are usually disposed in the path of this current to intercept and conduct out of its zone particles floating therein, and usually surround said lower opening to prevent return of fines thereto.

The distributor E usually revolves opposite the lower end of the non-rotary feed pipe C to spread pulverulent material descending through this pipe and distribute it centrifugally in the distributing zone in receptacle D so that it will be thrown across the separating zone of the rising current to enable the latter to extract fine particles.

The driving mechanism revolves the distributor and fan to continuously distribute the material to be separated and to cause current to rise through it in an endless path so that the fines may be separated and withdrawn through the fine outlet and the coarse withdrawn through the tailings outlet.

The separating chamber within the inner receptacle D comprises a lower distribution zone and a higher selection zone. The distribution zone is that part of the chamber across which the distributor E directs or throws the incoming material to be separated and in which the primary separation is effected, whereby the heavier pieces or particles fall through the ascending fluid current whence they are directed to the tailings outlet, and the lighter particles of dust or fines are carried upward by the fluid current into the selection zone. The distribution zone is relatively narrow, being of approximately disk or cone form according to the path imparted to the material by the rotary action of the distributor. The selection zone is that space above the distribution zone in which the dust resulting from the primary separation is subjected to a secondary separation whereby the heavier floating particles are precipitated and thereby separated from the lighter dust or fines, so that the outflowing current will carry only such lighter dust or fines. To accomplish such selection, the portion of the chamber constituting the selection zone is made of such increased lateral area and with such height from the distribution zone to a level adjacent the outlet opening, that the ascending fluid current therein is diffused or reduced in speed or intensity sufficiently to accomplish this result. In actual practice, for those materials requiring an efficient selection zone, the vertical dimension of this zone is increased beyond that shown in full lines in Fig. 1, as by lowering the distributor E (and by consequence the cones $n$ and $b'$ beneath) to the positions shown in dotted lines in Fig. 1, or to such levels as suffice to accomplish the desired result.

According to one feature of my present invention I preferably provide such a separator with my improved driving mechanism and preferably adapt this to operate the driven parts frictionally or by traction, to vary their speed, preferably differentially and independently, to disconnect either or both, and to drive each in the same direction, so that distribution and current can be varied to suit desired results, and adjustment and control are facilitated, and I preferably provide a movable tailings receiver responsive to variations in the weight of the stream of material flowing through the separator, for automatically controlling operation of the separator with variations in the weight of such stream, and operatively connect said receiver to the driving mechanism, for automatically varying the driving mechanism with variations in the weight of such stream, to control operation of the separator and to accelerate speed of revolution of the distributor and the blower with increase in the carries the hopper g under which the feed pipe C is suspended.

The edges of the rollers and wheels are preferably chamfered to facilitate entering the rollers between the wheels and afford the slight lift necessary to raise the upper wheels so they will ride on the rollers and to raise the fan F and the beaters d' and the wall e' to their operating positions.

According to another feature of my invention I preferably provide, within the separating chamber and below and around the upper outlet, an annular outer baffle c' or wall extended inwardly a partial distance across the upper outlet, having an inner edge above an intermediate portion of the separating chamber, and affording inwardly of such edge an outlet passage for passing such current from such portion of said chamber to said blower, for intercepting and inwardly deflecting such current, and spaced a substantial distance above said distributor, and affording below said outer annular wall and above said distributor a substantial selection chamber in which particles may precipitate below said wall.

According to another feature of my invention I preferably provide circumferentially spaced rotary beaters d' in the upper part of the separating chamber and below the annular outer baffle wall c' and revolving in the path of the current flowing inwardly of said wall, for beating particles from such current flowing from the separating chamber to the blower, which beaters are spaced a substantial distance above the distributor, and afford below them a substantial selection chamber for receiving such particles, and afford between them passages for passing such current from the separating chamber to the blower.

According to another feature of my invention I provide an annular baffle wall e', preferably around and adjustably mounted, by a set screw u', on the blower shaft L, within the upper outlet D', and extended transversely outwardly a partial distance across the upper outlet, and having an outer periphery inwardly of and adjacent the inner periphery of the upper outlet and above an intermediate portion of the separating chamber, and spaced a substantial distance above the distributor E, and affording between the outer periphery of said wall and the upper opening an annular passage for the current flowing from the separating chamber to the blower, for deflecting such current outwardly from the inner portion of said chamber and defining the path of said current above an intermediate portion of said chamber, and for affording below said wall and above said distributor a substantial selection chamber in which particles may precipitate from such current below said wall, the outer periphery of which wall e' is preferably spaced inwardly of the inner periphery of the outer baffle wall c', so that these walls afford between their edges an annular outlet passage S' affording a substantially direct upward passage above an intermediate portion of the separating chamber.

According to another feature of my invention I vertically adjust the space below the wall e' and above the distributor to suit material being treated or to vary fineness of product, and my invention provides for vertically adjusting one or the other of said parts relatively to the other of said parts and preferably for doing this during operation and preferably from without the machine, and I preferably accomplish this by providing a male screw thread on the pipe T and a female screw thread on its driving wheel or member U, so that the pipe can be vertically adjusted in the member to raise or lower the position of the distributor E to vertically vary the area of the separating chamber above the distributor E and below the wall e'. Preferably this pipe is provided with a groove or slot h engaged by a pin i on a nut lock j which is shown as a collar vertically slidable on the hub of the wheel U, which hub has a notch k in which the pin i drops when the lock is down, so that the wheel, lock, and the pipe T must then revolve together. When the lock is lifted until the pin clears this notch, and is driven by hand, it revolves the pipe to screw it up or down in the wheel and thus vary the height of the distributor relatively to the wheel and thus to vary the vertical distance between the distributor E and the wheel e'. When the lock is dropped the pin again enters said notch and locks the pipe and wheel together. Starting at the mean position of the disc or distributor E (as shown in dotted lines in Fig. 1) the pipe can be screwed up during operation by merely raising and holding the lock to hold the pipe stationary until the wheel has screwed it up to the desired point and then releasing the lock.

A forked lever S preferably raises and clutches the lock j from without.

The end of the shaft T rises and falls in the bearing f to allow for this vertical adjustment. A bearing l preferably in the lower end of the fan drive pipe L is preferably provided to slidingly receive and maintain the pipe T concentrically of the pipe L and to close the space between them against upward leakage of dust or downward leakage of lubricant. A gravity ring or packing m rests on the upper end of the pipe T and closes the space between it and the wall of the upper recess in the shell e for receiving the bearing f, to keep dust from entering this bearing. According to another feature of improvement, within the vortex ring of separating fluid I preferably cool, dry or aerate the mechanism or the material being fed, and to accomplish this I preferably provide means for introducing external fluid to and into and around and out of the path of the vortex ring of circulating separating current within the closed chamber of the separator, as by an annular chamber n communicating with the annular space between the feed pipe C and distributor pipe T and discharging inwardly of the upleg of the vortex ring of separating current through the annular spreader G' above the distributor E and having one or more adjustably valved inlets o through which fluid may enter or be forced from any source of compressed air, at the pipe a2, as desired. The chamber n is preferably formed in a ring like casting p mounted on the shell e and carrying the feed pipe C and the feed hopper g.

According to another feature of my improvements in air separators I preferably provide pressure controlling or exhausting means communicating from concentrically of the vortex ring of circulating fluid and preferably below the distributor from within to without the outer casing, and preferably concentrically of and within the upleg of the vortex ring of circulating separating current and within the separating chamber and above its lower tailings dropping outlet and below its distributing zone, for exhausting or controlling pressure or withdrawing vapor or relieving excess air from the separator, and preferably to accomplish this my invention provides a relief pipe m' which preferably has a large flaring open end affording a vapor collecting chamber H' immediately below the distributor E, and an outwardly and upwardly flaring adjustable flange n' which affords an annular suction outlet b2 from and inwardly of the upleg of separating fluid and affords between said inclined flange and the conical lower wall of the separating chamber a variable annular upward passage for the returning current upflowing below the distributor, which flange is preferably spaced below the distributor and above the lower inlet, and is preferably vertically adjustable relatively to the distributor and to the lower inlet, to vertically vary said suction outlet and to radially vary the width of said upward current passage, to vary such vapor exhaust, or to vary such current below the distributor and above the lower inlet, and preferably also serves as a deflector for outwardly curving or ballooning the returning current beneath the distributor to cause it to flow outwardly around the latter, which pipe descends through the tailings cone and the upper part of the tailings outlet J and may be valved as shown and connected by a controlling valve o' with a suction or other pipe c2 for opening or closing communication with the interior of the separator or for controlling withdrawal of vapor or introduction of hot air beneath the distributor thereof.

Preferably according to one feature of my invention I construct the distributor disc E with a rotary assembly of a plurality of radially variable plates or segments, preferably arranged in the form of an inclined both radially expansible and vertically adjustable cone the steepness and outward projection of which can be varied as by a screw a' and spring b' to vary the angle and to radially vary the outward point of discharge of material across the ascending current to suit this angle to the best extraction of fines as the current rises through the material, and to radially vary the width of the current passage around the disc E to vary the space through which such current is permitted to flow to vary such current to vary the fineness of such extraction.

This may be accomplished by any suitable construction, but I prefer the rotary assembly shown, which comprises an upper plate or ring G', around the shaft T and spaced above a lower plate or ring Q', around the screw a', and a ring of radially adjustable perforated or slotted plates or segments R', around and carried at their inner ends by the screw a' and spring b', and extended at their outer ends beyond the periphery of the lower plate Q', all being detachably connected by screw threaded bolts g2, adjusted by nuts h2, and all carried by the rotary shaft T. As shown each plate R' has a slot i2 slidingly engaging the corresponding bolt g2, and each plate R' is radially slidable between the lower plate Q' and a clamp n2 which encircles its bolt g2, and the plates R' are collectively adjusted to vary their inclination and radial projection by adjusting the nut j2 relatively to the spring b' to lower the inner ends of the plates R' and correspondingly radially project their outer ends to radially vary the distribution and air space around them as desired, whereupon the plates R' are held in their adjusted position by screwing in the nuts h2 until the plates R' are suitably clamped between the clamps n³ and the lower plate Q'.

The adjustable distributor construction here shown and described is not claimed in the present application but it is claimed in a divisional application filed March 8, 1934, Serial No. 714,961.

Figure 4:
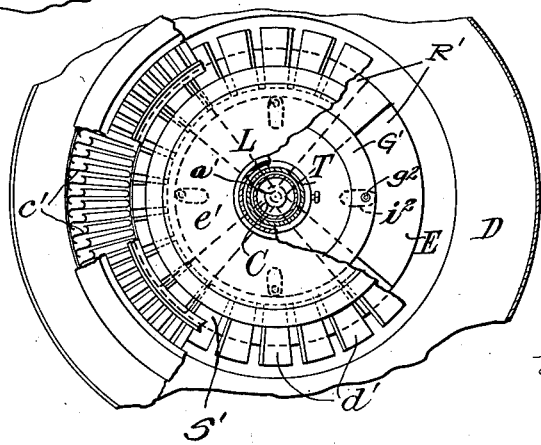
Figure 5:
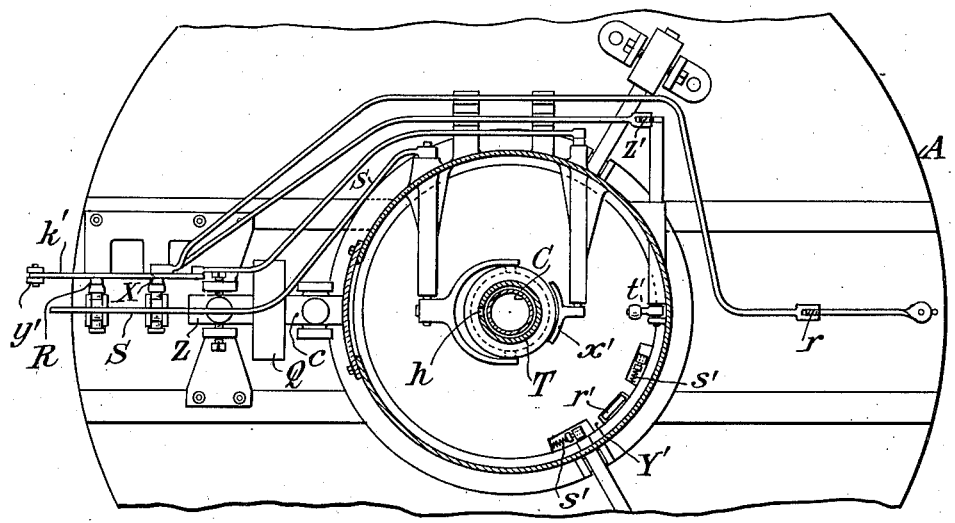
Figure 6:
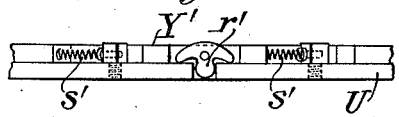

The rising current in the separating chamber is deflected inwardly as it approaches the fan opening, and according to another feature of my invention I provide within the chamber D a wall e' spaced below and adjacent to and extending outwardly a substantial distance across the fan opening and spaced a substantial distance above the distributor and affording below said wall and above said distributor a substantial separating chamber in which large particles floating in such current may precipitate and affording around the outer edge of and above said wall a passage through which such current may flow from said chamber to said opening, which substantial separating chamber is preferably adjustable to vary its area by varying the vertical distance between said wall and said distributor to vary the fineness of material floating in the current flowing over said distributor and in under and then out around the outer edge of said wall, such variation being effected according to my invention by varying the vertical distance between said parts by vertically adjusting one of said parts relatively to the other of said parts as by adjusting the distributor E as before described. The wall e' preferably revolves and moves vertically with the fan shaft L on the lower end of which it is shown as set adjustably by the screw u', and its vertical adjustment toward or from the fan opening varies the current by varying the space above the wall through which current is permitted to flow to such opening, as well as varying the height of the substantial separating chamber below the wall e' and above the supplying means or distributor E and is preferably independent of the vertical adjustment of the latter. Preferably also in the path of the current flowing to the fan opening my invention provides within the chamber D successive downwardly acting superposed spaced staggered deflecting faces or selector baffles or means to intercept large particles which may be carried in such current and conduct them across or deflect them through or out of its path. These preferably consist of annular depending deflecting means around the upper opening and preferably comprise a circular row of inclined S-shaped spaced overlapping plates c' affording a circuitous current passage between them and having their lower or outer convex faces staggered in relation to and overlapping their inner or upper hollow sided or concave faces which are opposed to and across the direct path of the current, as shown in Fig. 4, and around which it must sweep to reach the throat of the fan, so that it will not be subjected to any current void in which fine material might precipitate but its path will be intercepted by walls across it affording successive relatively staggered spaced baffle faces sufficing to arrest and deflect downwardly particles too large to float in it inwardly and upwardly under or around or through such a circuitous path. These selector baffles are preferably open at their lower ends and spaced around and above the wall e' and a substantial distance above the discharge edge of the distributor so as to afford below the selector and above the distributor a substantial separating chamber into which the selector may deflect or conduct particles and discharge them inwardly of the current path so they may fall across the stream of material being distributed and be returned to it.

The baffles c' are preferably circularly arranged within and radially of the separating chamber D, as by removably sustaining them through its upper outlet as shown, and their downwardly acting particle intercepting faces extend radially outwardly across the path of the current flowing up through such chamber, and preferably are widened longitudinally in their radial extension to afford suitable width for the current passing spaces between them throughout their longitudinal extension to the end that the spaces may be wide enough for the greater volume of current adjacent the outer wall of the chamber and taper inwardly as the volume of inward current diminishes. The downwardly extending inclined upper faces of these baffles release or shed any material precipitating on them for preventing accumulation of such material between them that might reduce the current passages between them.

My invention provides means for separating from the outflowing dust or fines such larger floating particles as may have failed to separate and precipitates therefrom in the selection zone, such as larger particles or flakes of relatively light specific gravity. For this purpose I provide a series of rotary vanes $d'$, preferably located close beneath the outlet, these vanes being extended outwardly across the upflowing current of separated material so that they revolve transversely across the upflowing current carrying the lighter dust or fines. These vanes project in substantially horizontal manner and preferably in radial direction across the upflowing current, and are circumferentially spaced to form open upward passages between them for the free upflow of separated material from the selection zone up and through the outlet. The vanes are relatively narrow and sufficiently close together to intercept the direct upward movement of material, and are preferably rotated at such speed that they constitute beaters acting impactively to throw the larger particles out of the current of dust or fines and into the diffused ascending current in the selection zone. The vanes are located close enough beneath the outlet to be effective, and at the top of or above the selection zone, and consequently are separated by a substantial distance above the distribution zone. The vanes are relatively narrow, their vertical dimension being materially less than the height of the selection zone beneath them and materially less than the usual dimensions of the blades of the fan or blower F above the outlet. They are thus so proportioned that they do not encroach upon or limit the capacity of the selection zone, and they are so shaped and proportioned and revolve at such speed that they do not to any material extent act in opposition to the fan or blower. The vanes are preferably neither vertical nor horizontal, but adjusted to an intermediate inclination to suit the material being separated, preferably by being slightly twisted to afford a downward and outward impactive, impelling effect on the larger particles for beating them back or down into the diffused fluid current within the selector zone. The spaces between the vanes are open outwardly to permit the free outward centrifugal ejection of the larger particles which are taken from the ascending current by the action of the vanes. The vanes thus afford a foraminous wall having an effective separating action and distinguished from the foraminous sieves or screens sometimes heretofore used for the same object, they being effectively self-clearing or cleansing by centrifugal action and thereby free from the clogging which has been a serious disadvantage of such screens as heretofore used even when mounted rotatively. For revolving the vanes they may be mounted and driven in any suitable manner, a convenient means being by the shaft L, in which case they revolve at the same angular speed as the blower, but by being of much less area and less radial projection, and preferably by being twisted to afford an oblique action, their effect upon the outflowing current is small compared with that of the blower. In the construction shown they are conveniently mounted on the baffle $e'$ and thereby are capable of a suitable degree of vertical adjustment, which is apparent by comparing the full and dotted lines in Fig. 1.

When the baffle plates $c'$ are used, it is desirable to extend the vanes or beaters $d'$ outwardly beneath the lower ends of the baffle plates so that the particles which are arrested and separated from the current by the action of these curved plates, as they slide down and are discharged from the lower ends thereof, are immediately encountered by the beaters and driven outwardly or downwardly into the diffused current in the selection zone. They are thus prevented from entering the outflowing current, which, with the proportions shown in Fig. 1, where the outlet S' is of restricted area, is a somewhat concentrated or accelerated current. Thus the separation of the heavier particles precipitated within the baffle plates $c'$ from the outflowing current of dust or fines, is assured.

Preferably, according to another feature of improvement, my invention provides for slowly power jarring the separating chamber D, and the vertically movable upwardly spring pressed filtering means K mounted thereon, at variable and reduced speed intermittently from the driving mechanism which is preferably done from the speed reducing distributor driving wheel U' by a radially extending striker swinging on a horizontal axis above and extending outwardly of the blower F, as by a hammer $f'$ pounding on a rod $g'$ connected to the filter outwardly of and around the blower and operated by a cam $h'$ revolved by suitable intermittently acting frequency reducing means, as by a star wheel $i'$ moved by a tooth on the cylindrical hub $j'$ of the friction wheel U', so as to reduce the high speed of this to such low frequency speed as is desired for jarring.

As shown, the sub-blower internal parts of the separator, which surround the distributor, are preferably suspended or otherwise so supported as to be susceptible to the vibratory effect of the vertical power jarring mechanism while being sufficiently relatively positoned to co-operate with one another and with the other parts of the separator in performing their respective functions, preferably by mounting the separating chamber D on the free ends of vertically adjustable brackets $p2$ suspended by adjustable tension rods $o2$ from the top $d2$, so that the separating chamber is poised intermediate the free ends of such brackets, and by movably and yieldingly suspending the cones I and I' and their connected parts by suspension rods $q$ and springs $s2$, and by movably and yieldingly mounting the filter K on the separating chamber D by the vertical springs $e2$, so that vertical jarring of the jarrer will, by its movement on the separating chamber, have a vibratory effect on the latter and the filter.

According to one feature of my invention the jarrer mechanism preferably consists of a vibratorily vertically movable jarrer member $r2$ below the blower and in operative relation to one or more of the sub-blower internal parts of the separator, and a vertical anvil rod $g'$ carried by the jarrer member and extended therefrom upwardly without and past the outer edges of the fan blades and into the path of the vertical striker $f'$ above the top wall of the outer casing, for transmitting downwardly past the fan and to the jarrer member the impact of blows from the striker, for actuating the jarrer member to vibratorily affect the sub-blower parts coincident with such blows. Any suitable means for accomplishing this may be used but I prefer the construction shown in which the jarrer member is shown as a horizontal ring or plate vibratorily mounted on and around the separating chamber D, and vertically movably sustained thereon by the vertical springs $e2$ and arresting bolts $f2$, so that it can move downwardly with such impact and be moved upwardly by the springs and suddenly arrested by the bolts to transmit the effect of such arrest to the separating chamber to vibratorily effect it, and to suspend the filter troughs $x$ and $y$ from the jarrer ring so that they will be vibrated by the impact and participate in the movement of the jarring member and be jolted by its sudden arrest, and to mount and sustain the anvil rods $g'$ directly on the jarrer ring $r2$ so that these rods will be yieldingly sustained by such ring.

For simultaneously varying the speeds of both distributor and fan and to maintain established relation thereof my invention provides for coupling these together by link $k'$ to which each can be adjustably connected in its desired position, so that their relative relation may be maintained while both may be moved together by moving them through the link.

Interruption of outflow of tailings endangers filling the interior of the separator before such stoppage is discovered, and to prevent this my invention preferably provides, according to another feature of improvement, tailings weight operated operation controlling means, and means responsive to variations in the weight of the stream of tailings flowing from the separating chamber for varying or increasing the speed of the distributor or of the separating current, or for varying the supply of material to be separated with variations in such weight, preferably as automatic regulating or shutoff means for reducing speed or feed with increasing accumulation of tailings, and for stopping feed before such accumulation becomes dangerous. This may be variously accomplished but I prefer to make the tailings cone I vertically movable and to yieldingly sustain it as by rods $q$ yieldingly and adjustably mounted on one or more balancing means or beams or levers $r$ sustained by adjustable weights or balancing means $s$ to normally hold the tailings cone in vertical position but yield when its weight is increased by abnormal accumulation and then let it descend to the lower position shown in dotted lines in Fig. 1 and thus tilt the lever $r$ to close a regulating feed gate $t$ sliding in a transverse groove in the bottom face of the hopper $g$ to vary, diminish, or shut off the feed according to the vertical position of the tailings cone, so that feed will be regulated to that which can flow as a normal stream through the contracted tailings orifice J from the cone, and arrested when such flow is interrupted, and dangerous accumulation of material within the separator will be prevented.

The lever $r$ is preferably connected to the shifter X for varying speed of drive and controlling operation with variations in the vertical movement of the counter-balanced tailings cone I incident to variations in the weight of the stream of tailings which is dropped on to its cone and is conveyed by it from the separator, preferably in the construction shown by varying the supply valve $t$ to vary supply and by moving the shifter X to vary the variable speed driving means. Preferably as shown the bottom wall of the drive casing $e$ is above and serves as a stop for the inner end of the beam $r$ to limit downward movement of the cones I and I', and the adjustable nut $q'$ serves as a stop for limiting upward movement of these cones, and the position and movement of the vertical arm of the beam $r$ indicates variations in the weight of the stream of tailings and fine material falling into the cones and affords suitable signaling means for indicating operating conditions and control and arrest of operation.

According to another feature of my improvements in air separators my invention provides separated material weight operated operation controlling means around the tailings conveyor I, and means responsive to the weight of the stream of separated material flowing into said separated material receiving means for controlling operation or increasing speed of the distributor or varying or increasing speed of revolution of the distributor and separating current, or for varying or reducing or arresting supply of material to be separated with variations in the weight of the stream of such separated material while it is being precipitated within the settling chamber of the separator, so that operation can be controlled by the weight of the separated material flowing through the separator without and around the stream of tailings being conveyed from the separating chamber. This may be variously accomplished and the weight of any part of the separated material may be utilized for this purpose, but I prefer to utilize only the weight of the finest separated material for such regulation, and to accomplish this by providing a vertically movable weight operated counterbalanced fine separated material receiving cone I' around and in spaced relation to the cone I and affording between these an annular fine separated material receiving and settling chamber $z$ for receiving fine separated material from the filter troughs $y$ and conveying the stream of such material through the fine separated material outlet J', so that it will be isolated from the tailings which are conveyed from the cone I to the tailings outlet J. Preferably the cone I' carries and moves with the cone I and is sustained by the rods $q$ and balancing beams or levers $r$, and is counter-balanced by the adjustable weight $s$, so that variations in the weight of the stream of separated material flowing into the cone I' will cause it to tilt the lever $r$ and operate the supply gate $t$ and the shifter X as before described as to the tailings cone I, both cones in the construction shown preferably operating together and co-operating to mutually control speed and supply.

My invention preferably provides means for catching the whirling air as it leaves the fan, and slicing it off into diagonally downwardly extending segregated streams so as to terminate its whirl and send it inwardly toward the filter, preferably as inclined vanes $u$ between the outer wall of the casing A and the outwardly flaring conical ring $v$ and terminating in vertical radial baffles $w$ from which the descending current is directed opposite the center of an adjacent filter trough $x$. The troughs $x$ are preferably rectangular in cross section and arranged in two rows so that they form a current void in front of their outer hollow faces in which floating dust may enter and precipitate while the inclined bank of air in front of them will deflect the current between them and toward the hollow face of the next inner row of troughs around which it will be similarly diverted. These troughs intercept the larger particles of dust so that only very fine dust can be carried past them, and to separately extract such very fine dust my invention provides reversely hollowed troughs $y$ successive to the troughs $x$ and arranged in staggered rows concentrically inwardly thereof with their convex faces opposed to the approaching current so that as this flows between them it will be subjected to somewhat of a vacuum effect as it passes the edges of these troughs which has the effect of causing extremely fine dust to leave the current and precipitate in these hollows in their lee sides.

To separately withdraw the product of the troughs $x$ and $y$ I prefer to provide an annular fine chamber $z$ beneath the troughs $y$ for receiving discharge from these between the tailings cone I and intermediate fine receiver or cone I', which is provided with a contracted or normal discharge orifice or fine outlet J' for discharging a normal stream of separated fine material, such for example as this almost impalpable product.

My invention includes an improved flexible or universal joint, especially applicable for the tailings and other pipes to permit vertical and oscillating movement of their cones and for preventing leakage between these and their outlets. This comprises a male member having an external portion H2 in the shape of a segment of a sphere and a female member having a circumferentially grooved inner cylindrical portion I2 receiving and fitting the spherical portion of the male member so that if the groove is normally coincident with the crown of this spherical portion it acts to make a joint therewith within the limits of oscillation of said parts.

This groove is filled with annular packing material, either a metal or fibrous ring, or grease or flexible or viscous packing, to seal the joint between the parts while permitting their relative oscillation and in this case vertical sliding relatively to the other. As shown the members are tubular and telescopic, to afford downward ways or conduits through them communicating with the very fine, the tailings, and ventilating outlets respectively.

According to another feature of my invention I preferably vertically and at variable and reduced speed from the distributor driving wheel U' intermittently power jar the tailings cone I and the fine conveying cone I', preferably by mounting these resiliently on sustaining springs $s2$ around their suspending rods $q$, and by intermittently lowering the cones by compressing these springs by slightly tilting the lever $r$ by means of the cam $p'$ which intermittently raises the inner end of the lever to compress the spring and releases the lever to permit the spring to raise the cones until the jarring nut $q'$ on the rods strikes the top of the outer casing and suddenly arrests upward movement of the cones with an upward jarring effect which is desirable for loosening and releasing material clinging in the cones. The cam $p'$ may be operated in any suitable manner, but I prefer to operate it from the distributor driving wheel U' and I prefer to use friction for this, and to reduce speed by driving a roller $k2$ from the bottom of the wheel U' and to use a smaller roller $l2$ to frictionally drive a disc $m2$ on the shaft of which is mounted a reverse lifting cam $p'$ which raises the end of the lever $r$.

In operation of the embodiment of my improvements hereinbefore described, the distributor E being in the lowermost position and locked to rotate with its disc or wheel U, and the driving rollers V and O having been moved out of engagement with the wheels N and U, revolution will be imparted to the driving rollers by suitable means as the belt pulley Q, and the apparatus will be started by moving in the shifters X and R to engage the rollers with the wheels and impart motion to these.

The rollers will be moved to the mid-position and then varied therefrom respectively to give the desired speed to the distributor and the fan. The distributor will be expanded or contracted radially by the screw $a'$ and spring $b'$ and adjusted vertically by raising the nut lock $j$ out of engagement with the wheel U and holding it to prevent rotation of the pipe T until this is screwed through the wheel U sufficiently to give the desired vertical position of this pipe, when it will be again locked to this wheel by dropping the lock $j$ into engagement with the notch in the wheel. Speed may be varied for either part independently by moving its shifter or for both simultaneously by coupling the shifters together with the connector $k'$ and moving them together through it.

The fan will cause the current to flow up through the substantial variable selecting chamber above the distributor E and below the wall $e'$ and out around the outer edge of this wall and through the variable space above said wall to the fan opening and down around the feed chamber, and this current will be varied by adjusting the speed of the fan or the height of the wall $e'$ or the distance between said wall and the distributor to separate the fineness desired and to float out the fines which will be intercepted by the filter and precipitate in the outer chamber, and the extremely fine will be sucked out of the returning current by the reverse filter and descend through the fine outlet J', and the clean return current will again rise through the distributed material. Large particles will be extracted from the rising current by precipitating in the substantial separating chamber below the wall $e'$ and above the distributor E and in advance of the blower and upwardly flying chips will be intercepted by the revolving paddle blades above the distributor and by the baffles $c'$ across the upper outlet to the fan.

The returning current will be deflected upwardly by the adjustable lower conical ring $v'$ and contracted into the outer portion of the lower opening of the distributing chamber by the cylindrical part $l'$ of the relief pipe $m'$ and will be deflected outwardly substantially at right angles to the direction of distribution of material by the adjustable top ring or deflector $n'$ of this pipe to give the desired force or speed and direction of current at these points in its path.

Air will be introduced through the inlet $o$ to cool or aerate or dry the material when treated, or to force out vapor arising therefrom, and these excess airs or these vapors will be relieved through the pipe $m'$ when desired, and when such introduction or relief is not desired any dust settling in the pipe $m'$ will be returned to the tailings through the three way cock o' for closing this outlet, which should be closed when the valved inlet o is closed.

Unlimited feed may be supplied to the hopper g, from which its entrance to the separator will be automatically controlled by the regulating gate t which will be operated by the rise and fall of the tailings cone I and the fine cone I' with variations in the weight of the stream of material flowing to either or according to its ability to discharge the material descending to it.

The tailings cone may be vibrated by the cam p' operated by the friction wheel U' to slightly lift the inner end of the lever r to depress the tailings cones and when released to permit its spring s2 to lift it until its nut q' bangs against the top wall of the casing A and arrests it with a sharp upper jar. To permit this movement without affecting the gate t the latter is connected to this lever with a slot or lost motion connection allowing for this slight independent vibration of the lever.

Compression springs e2, resisted by jarring bolts f2, preferably yieldingly sustain the filter K from the separating chamber D, which springs yield when the hammer f' strikes and as they expand are arrested with a jolt by the bolts f2 which thus vertically jar the separating chamber D.

It will be understood that my improvements can be variously and advantageously availed of in whole or in part as the judgment of those skilled in the art may dictate, without departing from the spirit of my invention, which is not limited to the particular details set forth as constituting the preferred form thereof, or to the particular applications hereinbefore set forth.

The rollers are preferably shifted from below by a lever y' and the distributor is preferably raised from below and without by a rope z'.

Preferably a centrifugal governor X' revolving with the wheel U, through a lever x' operates the shifter X to control speed by automatically adjusting the roller V.

Work preferably regulates speed and also feed automatically, as by a governor Y', shown as part of the wheel U, which revolves with it and moves axially of it, and also moves circumferentially of it against springs s', to lift it through a dog r' when load increases, to tilt a lever t' to vary speed, and Z' to vary supply, as load varies.

What I claim is:

1. In combination, a casing enclosing a chamber, a receptacle in said chamber having upper and lower openings communicating therewith, blower means for causing a fluid current to circulate through and around said receptacle, distributor means for distributing material in said receptacle, an outer fluid introduction inlet communicating from without to within said casing introducing fluid around said distributing means, and a fluid exhaust outlet communicating from without said casing to within said receptacle for withdrawing fluid below said distributing means, said exhaust outlet comprising a conduit extended from within said receptacle to without said casing, and having an ingress opening within said receptacle and below said distributor and above said lower opening, and having a discharge opening without and externally of said casing, for withdrawing such fluid from within said receptacle below said distributor means and above said lower opening, and for discharging such withdrawn fluid without said casing.

2. In combination, a casing enclosing a chamber, a receptacle in said chamber having upper and lower openings communicating with said chamber, distributor means for supplying pulverulent material to be separated within said receptacle, blower means for causing a fluid within said chamber to circulate up through said receptacle and upper opening into said chamber and around said receptacle and return through said lower opening to float fine material from said receptacle into said chamber, and an outer fluid inlet communicating from without said casing to within said receptacle for introducing other fluid from without said casing into said receptacle for subjecting such material to the action of such other fluid, said outer fluid inlet comprising a conduit extended from without said casing to within said receptacle, in communication from without said casing to within said receptacle, having an intake opening without said casing, for intaking outer fluid externally of said casing, and having a discharge outlet within said receptacle and above said distributor, for discharging such outer fluid within said receptacle above said distributor, for subjecting separated material within said receptacle and above said distributor, to the action of such outer fluid above the zone of distribution of such material.

3. In combination, a casing enclosing a chamber, a receptacle in said chamber having upper and lower openings communicating therewith, distributor means for supplying material to be separated in said receptacle, blower means for causing the fluid in said chamber to circulate up through said receptacle and upper opening into said chamber and return through said lower opening to float fine material into said chamber, and an external discharge fluid exhaust conduit, extended from within said receptacle to without said casing, in communication from within said receptacle to without said casing, having an intake opening within said receptacle, for exhausting fluid from within said receptacle, and having an external discharge outlet externally of said casing, for discharging such exhausted fluid externally of said casing, said intake opening being disposed centrally within and spaced inwardly from said receptacle, and being below and adjacent said distributor and a substantial distance above said lower opening for exhausting such fluid centrally from within said receptacle and below and adjacent said distributor and a substantial distance above said lower opening.

4. In a separator, in combination, a casing enclosing a separating chamber and having a lower current inlet and an upper current outlet, a distributor within and for supplying material to be separated to said chamber, a blower for causing a fluid current to enter said chamber through said inlet and flow up through said chamber and said outlet to float fine material from said chamber, and a downwardly and outwardly flared inner annular baffle member inwardly of and below said outlet and extended outwardly below said outlet and above the inner portion of said chamber, for outwardly deflecting such current under said member, and shedding fine material settling on said member, and having an outer periphery below and adjacent and spaced from said outlet, and above an intermediate portion of said chamber, for defining around said member and above such portion of said chamber an outlet passage through which such current may flow from said portion of said chamber to said blower.

5. In a separator, in combination, an outer casing enclosing a settling chamber, an inner casing enclosing a separating chamber and having a lower current inlet and an upper current outlet communicating with said settling chamber, a material distributor in said separating chamber, a conduit through said outlet for supplying material to be separated to said distributor, a blower for causing a fluid current to enter through said inlet and flow up through said separating chamber and through said outlet to float fine material from said separating chamber, an annular baffle member below said outlet and within and extended laterally a substantial distance across said separating chamber, for laterally deflecting such current below said member, spaced a substantial distance above said distributor, and affording below said member and above said distributor a substantial separating chamber, for receiving particles precipitated from such deflected current, and affording past the edge of said member an outlet passage from said substantial separating chamber to said upper outlet, for out-passing such current to said outlet, and a vertically adjustable inner annular valve below said distributor and within and spaced inwardly of said lower inlet, for defining between said valve and said lower inlet an annular space through which such current may upflow within said inlet, and adjustable relatively to said inlet to radially vary the space between said valve and said inlet through which such current may upflow toward said substantial separating chamber, for varying upflow of such current into said substantial separating chamber, for varying said separation.

6. In a separator, in combination, an outer casing enclosing a settling chamber, an inner casing enclosing a separating chamber and having a lower current inlet and an upper current outlet communicating with said settling chamber, a material distributor in said separating chamber, a conduit through said outlet for supplying material to be separated to said distributor, a blower for causing a fluid current to enter through said inlet and flow up through said separating chamber and through said outlet to float fine material from said separating chamber, and adjustable annular valve means within and spaced inwardly from the wall of said separating chamber, and below said distributor, and within said lower inlet, affording around said valve means an annular upward current passage through which such current may upflow past said distributor, for up-passing such current from said inlet to said distributor, and adjustable relatively to said distributor to radially vary below said distributor the space without and around said valve through which such current may upflow below said distributor and toward said separating chamber, for varying upflow of such current, for varying such separation.

7. In a separator, in combination, a casing enclosing a separating chamber and having a lower current inlet and an upper current outlet, supply means for supplying material to be separated to said chamber, blower means for causing a fluid current to enter said chamber through said inlet and flow up through said chamber and through said outlet to float fine material from said chamber, said receptacle having an inwardly extended annular wall having an inner periphery below said blower and around said upper outlet and above an intermediate portion of said separating chamber, for defining within said wall such upper outlet, an annular outwardly extended inner baffle wall within said receptacle and adjacent said upper outlet, and having an outer periphery above an intermediate portion of said separating chamber and spaced inwardly from said inner periphery, for defining around said inner wall and between said peripheries, an annular outlet passage above such portion of said separating chamber through which such current may flow from said separating chamber to said blower, and circumferentially spaced rotary beaters in the upper part of said casing and extended substantially radially across said outlet passage, revolving in the path of such current outflowing from said separating chamber to said blower, for beating from such outflowing current particles floating in such current, said beaters spaced adjacent said upper outlet and a substantial distance above said distributor and affording below said beaters and above said distributor a substantial separating chamber, for receiving such beaten particles, said beaters affording between them current outlet passages in communication from said substantial separating chamber to said blower, for outpassing such current from said substantial separating chamber to said blower.

8. In combination, in a separator, a casing enclosing a circular separating chamber having a lower current inlet and an upward current passage and an upper current outlet, distributor means within said chamber for supplying material to be separated in said passage, blower means for causing a fluid current to enter said chamber through said inlet and flow up through said passage and through said outlet to separate and float fine material from said chamber, and a vertically adjustable valve within and concentric of and spaced from the wall of said chamber, below said supplying means and within said lower inlet, for defining around said valve and inwardly of said inlet the space through which such current may upflow below said supplying means, and vertically adjustable to radially vary such space, for varying such upflowing current, to vary the fineness of such separation.

9. In combination, a casing enclosing a chamber having a lower current inlet and an upward current passage and an upper current outlet, distributor means within said chamber and spaced a substantial distance below said outlet for supplying material to be separated in said passage, blower means for causing a fluid current to enter said chamber through said inlet and flow up through said passage and through said outlet for separating and floating fine material from said chamber, and particle interceptor selection means within said chamber across the path of such current flowing to said outlet and spaced a substantial distance above said distributing means and affording above the latter and below said selecting means a substantial separating chamber in which large particles floating in such current may precipitate and comprising a ring of circumferentially spaced material downward deflector successive baffle faces across the path of such current flowing from such substantial chamber to said outlet for intercepting large particles flowing in such current and affording between said faces sinuous current passages communicating between said substantial chamber and said outlet.

10. In combination, a casing enclosing a chamber having a lower current inlet and an upward current passage and an upper current outlet, supply means within said chamber for supplying material to be separated in said passage, blower means for causing a fluid current to enter said chamber through said inlet and flow up through said passage and through said outlet for separating and floating fine material from said chamber, and particle interceptor selection means for selecting coarse material from such current flowing to said outlet comprising a plurality of spaced material deflector successive baffle faces disposed in staggered relation across said outlet with such faces opposed to the direct path of such current flowing from said chamber to said outlet for intercepting and preventing coarse particles in such current from reaching said outlet and affording between said faces sinuous current passages communicating between said chamber and said outlet.

11. In combination, in a separator, a casing enclosing a circular separating chamber having a lower current inlet and an upward current passage and an upper current outlet, supply means within said chamber for supplying material to be separated in said passage, blower means for causing a fluid current to enter said chamber through said inlet and flow up through said passage and through said outlet to separate and float fine material from said chamber, and a plurality of successive overlapped relatively staggered material interceptor spaced baffle members around said outlet having material deflector faces opposed to the direct path of such current flowing from said chamber to said outlet for intercepting and preventing coarse particles in such current from reaching said outlet.

12. In combination, in a separator, a casing enclosing a separating chamber having a lower current inlet and an upward current passage and an upper current outlet, supply means within said chamber for supplying material to be separated in said passage, blower means for causing a fluid current to enter said chamber through said inlet and flow up through said passage and through said outlet to separate and float fine material from said chamber, and a plurality of material interceptor spaced lower hollow faced baffle members between said chamber and said outlet and having their hollow faces opposed to the direct path of such current flowing to said outlet to intercept and prevent coarse particles in such current from reaching said outlet.

13. In combination, a casing enclosing a separating chamber having a lower current inlet and an upper current outlet, supply means for supplying material to be separated to said chamber, blower means for causing a fluid current to enter said chamber through said inlet and flow up through said chamber and upper outlet to separate and float fine material from said chamber, said casing having around said chamber and below said outlet a downwardly and outwardly extended particle downward deflector inner wall below and concentrically of said outlet, and rotary particle outbeater means within said chamber and below said outlet and opposite and encircled by and downward particle deflecting wall for outbeating toward said wall coarse particles floating in such current flowing toward said outlet.

14. In combination, in a separator for separating fine from coarser material, an outer casing enclosing an outer chamber, an inner casing enclosing a separating chamber having an upper current outlet and a lower current inlet communicating with said outer chamber, blower means for causing a fluid current to flow up through said separating chamber and upper outlet into said outer chamber and return through said lower inlet for separating and floating fine material from said inner chamber to said outer chamber, rotary drive means above and for operating said blower means, power operated jarrer means below said blower means, in operative relation to one of said casings below said blower means for jarring such casing below said blower means, comprising a vertically extended anvil member without and below said blower means and in operative relation to one of said casings below said blower means for impactively jarring such casing below said blower means, and extended vertically past and above said blower means, and vertically impactive power operated hammer means above said blower means and in operative relation to said anvil means for vertically impactively striking said anvil means, and in operative relation to and power operated by said drive means for vertically impactively striking said anvil means above said blower, for impactively jarring such casing below said blower, to facilitate flow of material within such casing, said vertically impactive hammer means disposed above said outer casing, and said vertically extended anvil member within and enclosed by said outer casing and vertically extended upwardly within said outer casing and having an upper end above said outer casing and below and in juxtaposition to said vertically impactive hammer means above said outer casing, for receiving vertical impact from said vertically impactive hammer means above said outer casing and for transmitting such vertical impact vertically through said outer casing and without and vertically past and below said blower means to one of said casings below said blower means, for impactively vertically jarring such casing inwardly of and through and from above said outer casing from said vertically impactive hammer means above said outer casing.

15. In combination, in a separator for separating fine from coarser material, an outer casing enclosing an outer chamber, an inner casing enclosing a separating chamber having an upper current outlet and a lower current inlet communicating with said outer chamber, a rotary blower for causing a dust laden fluid current to flow up through said separating chamber and upper outlet into said outer chamber and return through said lower inlet for separating and floating fine material from said inner chamber to said outer chamber, drive means above and for revolving said blower, a filter around said lower inlet for cleaning from said current fine material floating in such current toward said lower inlet, and power operated vertically actuated filter jarrers below and around and extended upwardly past and above said blower and in operative relation to and power operated by said drive means for jarring said cleaning means, said jarrer means comprising a vertically extended anvil member without and below and extended vertically past and above said blower means, and within and enclosed by said outer casing, and in operative relation to said filter below said blower means, for jarring said filter, and extended vertically up within and through and above said outer casing, and vertically impactive power operated hammer means above said outer casing and above and in operative relation to said upper end of anvil member for vertically impactively striking said anvil member and in operative relation to and power operated by said drive means, for vertically impactively striking said anvil member above said outer casing, for vertically impactively jarring said filter means below said blower, inwardly of and vertically through said outer casing.

16. In a separator, in combination, an outer casing enclosing a settling chamber, an inner casing enclosing a separating chamber and having a lower current inlet and an upper current outlet communicating with said settling chamber, a material distributor in said separating chamber, a conduit through said outlet for supplying material to be separated to said distributor, a blower for causing a fluid current to enter through said inlet and flow up through said separating chamber and through said outlet to float fine material from said separating chamber, an inwardly extended annular baffle wall within said separating chamber and having an inner periphery below and around said upper outlet and above an intermediate portion of said separating chamber, for inwardly deflecting such current toward said outlet, and an annular outwardly extended inner baffle member within said receptacle and above the inner portion of said separating chamber, for outwardly deflecting such current toward said outlet, and having an outer periphery adjacent and spaced inwardly from and encircled by said inner periphery, for defining between said peripheries an annular current passage above an intermediate portion of said separating chamber, for passing such current from such portion of said separating chamber below said outlet to said outlet.

17. In a separator comprising a receptacle enclosing a separating chamber, having an inlet to said chamber at the lower part of said receptacle, and a discharge opening from the chamber at the upper part of the receptacle, a blower for causing a fluid current to circulate through said chamber, the discharge opening communicating directly outside the receptacle to said blower, means for introducing pulverulent material within said chamber, and distributor means for directing such material across such fluid current therein, the separating chamber comprising a lower distribution zone adjacent the distributor within which zone the heavy material or tailings is separated from the floating lighter material, and a higher selection zone communicating with and extended materially above the distribution zone, and of such height and increased lateral area that the diffused fluid current therein is effective to separate the lighter dust or fines from the heavier floating material and to precipitate the heavier material, said discharge opening forming an outlet from said selection zone as an upward passage, whereby the upflowing current at such outlet carries lighter dust freed from such precipitates but which may contain larger unprecipitated particles; the combination therewith of rotary vanes above said selection zone and spaced a substantial distance above said distribution zone, said vanes located at said outlet and extended outwardly across the upflowing current of separated material, the vanes being relatively narrow, their vertical dimension being materially less than the height of the selection zone beneath them, and being circumferentially spaced to form upward passages between them open beneath the vanes for the free upflow of separated material from said selection zone, whereby the vanes revolve transversely across the upflowing current carrying such lighter dust or fines and act on any larger particles floating upwardly with such current, to eject such particles, so that the upflowing dust or fines has ejected therefrom the floating larger particles carried with it, and the latter enter into the diffused current to fall therethrough.

18. A separator according to claim 17, the vanes being beaters rotated at such speed as to act by impact to throw the larger particles out of the current of dust or fines into the diffused current in the selection zone.

19. A separator according to claim 17, the vanes having their outer discharge ends radially extended with open upward passages between them.

20. A separator according to claim 17, the vanes having their outer ends separated to form open outward discharge passages between them, whereby they clear themselves of the ejected larger particles.

21. A separator according to claim 17, the vertical dimension of the vanes being materially less than that of the blades of the blower.

22. A separator according to claim 17, having an annular baffle defining the inner margin of the discharge opening, and the vanes extended beyond the outer periphery of such baffle.

23. A separator according to claim 17, having an annular baffle defining the inner margin of the discharge opening, said baffle being rotative and mounted on a vertical drive shaft, and the vanes carried rotatively by such baffle.

24. A separator according to claim 17, having an annular baffle defining the inner margin of the discharge opening, said baffle being rotative and mounted on a vertical drive shaft and vertically adjustable thereon, and the vanes mounted on said baffle whereby they are adjustable toward or from the discharge opening.

25. In a separator comprising a receptacle enclosing a separating chamber having a lower current inlet and an upper current outlet, a blower adjacent said outlet for causing a fluid current to enter said chamber through said inlet and flow up through said chamber and emerge through said outlet to the blower to float fine material from said chamber, and means for supplying material to be separated to said chamber, the outlet being within an inwardly directed annular baffle plate defining the outer margin of the opening; the combination therewith of a rotary, outwardly-flared, annular, inner baffle member within and extended outwardly a substantial distance across said outlet, having an outer inclined face defining the inner margin of said outlet, and vertically adjustable to vary the space between said face of the baffle member and the outer margin of said outlet, through which space the current may outflow and the separator having an expansion space above the adjustable baffle member and between the outlet and the blower, in which the current may expand before flowing to the blower.

GEORGE HOLT FRASER.

CERTIFICATE OF CORRECTION.

Patent No. 1,987,615. January 15, 1935.

GEORGE HOLT FRASER.

It is hereby certified that error appears in the printed specification of the above numbered patent requiring correction as follows: Page 6, first column, line 75, for "March 8" read March 10; and page 10, first column, line 59, claim 1, after "casing" insert the word for; and that the said Letters Patent should be read with these corrections therein that the same may conform to the record of the case in the Patent Office.

Signed and sealed this 12th day of March, A. D. 1935.

Leslie Frazer (Seal) Acting Commissioner of Patents